(12) United States Patent
Juall

(10) Patent No.: US 6,853,723 B1
(45) Date of Patent: Feb. 8, 2005

(54) HIGH IMPEDANCE POLARITY DETECTOR

(75) Inventor: Chett Juall, Warren, NJ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/417,161

(22) Filed: Oct. 12, 1999

(51) Int. Cl.[7] .......................... H04M 1/00; H04M 3/00; H04M 9/00
(52) U.S. Cl. .................. 379/382; 379/399.01; 379/412
(58) Field of Search .............................. 379/382, 385, 379/387.01, 394, 395.01, 399.01, 412, 413.02, 414, 419

(56) References Cited

U.S. PATENT DOCUMENTS

| | | | | |
|---|---|---|---|---|
| 3,838,223 A | * | 9/1974 | Lee et al. .................. | 379/286 |
| 3,902,017 A | * | 8/1975 | Steward .................... | 370/485 |
| 4,063,037 A | * | 12/1977 | Heffernan et al. .......... | 379/125 |
| 4,220,827 A | * | 9/1980 | Burke et al. ................ | 379/156 |
| 4,447,673 A | * | 5/1984 | Elliott et al. ................ | 379/253 |
| 4,528,424 A | * | 7/1985 | Middleton et al. .......... | 379/183 |
| 4,852,160 A | * | 7/1989 | Kiko et al. ................. | 379/405 |
| 4,993,063 A | * | 2/1991 | Kiko ......................... | 379/405 |
| 5,086,459 A | * | 2/1992 | Perry ........................ | 379/200 |
| 5,247,573 A | * | 9/1993 | Reichelt ................. | 379/399.01 |
| 5,511,118 A | * | 4/1996 | Gores et al. ........... | 379/399.02 |
| 5,867,560 A | * | 2/1999 | Frankland ..................... | 379/81 |
| 6,282,271 B1 | * | 8/2001 | Gutzmer et al. ......... | 379/93.05 |

* cited by examiner

Primary Examiner—Binh Tieu
(74) Attorney, Agent, or Firm—Blakely, Sokoloff, Taylor & Zafman LLP

(57) ABSTRACT

A method and apparatus for measuring signals conveyed by a varying polarity voltage signal across a tip and ring in a telephone system is disclosed. A voltage present across the tip and ring is used to charge a charge storage device, and the charge is periodically discharged for a relatively short amount of time. The burst of discharge current for the short amount of time allows an optocoupler to accurately operate, while presenting a very high impedance to the telephone line.

15 Claims, 1 Drawing Sheet

HIGH IMPEDANCE POLARITY DETECTOR

TECHNICAL FIELD

This invention relates to telephony, and more particularly, to an improved technique of detecting the polarity of a voltage present across a set of telephone wires when a telephone is in the on and off hook state.

BACKGROUND OF THE INVENTION

In recent telephony systems, it has become common to transmit information to a called telephone while the called telephone is in the on hook state; i.e.; prior to the telephone being answered. A common example of this technique is what is known as caller identification or caller ID. In a caller ID system, the telephone number of the calling party is transmitted to the called telephone and is displayed prior to the called telephone being answered.

There are several common techniques of transmitting information to the called terminal prior to the called terminal being taken off hook. One signaling scheme involves the use of a varying polarity in a voltage presented across the tip and ring terminals of the called telephone in order to transmit digital data. For example, the polarity of the voltage, or the change in the polarity of the voltage, may represent ones and zeroes and may be interpreted to convey digital data. Such systems are known and in use today.

One problem with such systems is caused by the fact that the end user of the called telephone equipment must be isolated electrically from the telephone network itself. This is required in order to ensure that power surges, such as those caused by lightning, are not transferred through to the end user equipment and possibly to a human in contact with such equipment.

In order to provide such isolation, typically optocouplers are used. An optocoupler comprises a first device that turns an electrical current into a light signal, and a second device that converts the light signal back into an electrical current. If a strong power surge occurs on the telephone line, the isolation keeps the high voltage from reaching the end user.

The optocoupler requires a current through a diode in order to emit light. In order to ensure that all changes in the tip and ring voltage are accurately captured, the system must be arranged to present a relatively low impedance to the telephone system. If the impedance presented by the end user telephone equipment is too high, then the current will not be significant enough to ensure accurate capture of the data being conveyed through the optocoupler. On the other hand, if the impedance that is presented to the telephone system is too low, the other end of the telephone line, such as a central office will not be able to distinguish between the on and off hook state.

In view of the widespread use of polarity modulation (i.e; the varying of the polarity of a voltage) to transmit data to an on-hook receiving telephone equipment, there exists a need in the art for an improved technique of accurately detecting the polarity of a voltage presented to an end user telephone equipment. Preferably, the system should present a high impedance while providing high accuracy in the detection of polarity.

SUMMARY OF THE INVENTION

The above and other problems of the prior art are overcome in accordance with the present invention which relates to an improved technique of minimizing the power required for the accurate detection of voltage signals present between the tip and ring terminals of an on hook called terminal equipment. In accordance with the invention, a set of capacitors or other storage mechanism is utilized to store charge in response to a voltage presented across the tip and ring terminals. Once the charge is stored, any further power drain is eliminated.

The polarity of the voltage caused by the stored charge is then periodically sampled for a relatively short time. A latch captures the state of the polarity.

In a preferred embodiment, the sampled voltage is used to drive the optocoupler. Thus, the output current in the form of, for example, the capacitor discharge, is relatively large for a very short sample time and is sufficient to engage an light emitting diode in order to provide accurate detection. Put another way, minimization of the relatively large current required for accurate detection is achieved without significant power drain by only sampling the current for a relatively short time.

In a preferred embodiment, two capacitors are used. The circuitry with which each capacitor works is duplicated, with one set of such circuitry arranged to detect positive polarity changes in the tip/ring voltage, and the other arranged to effect negative polarity changes in the tip ring voltage.

DETAILED DESCRIPTION OF THE PREFERRED EMBODIMENT

Figure 1:
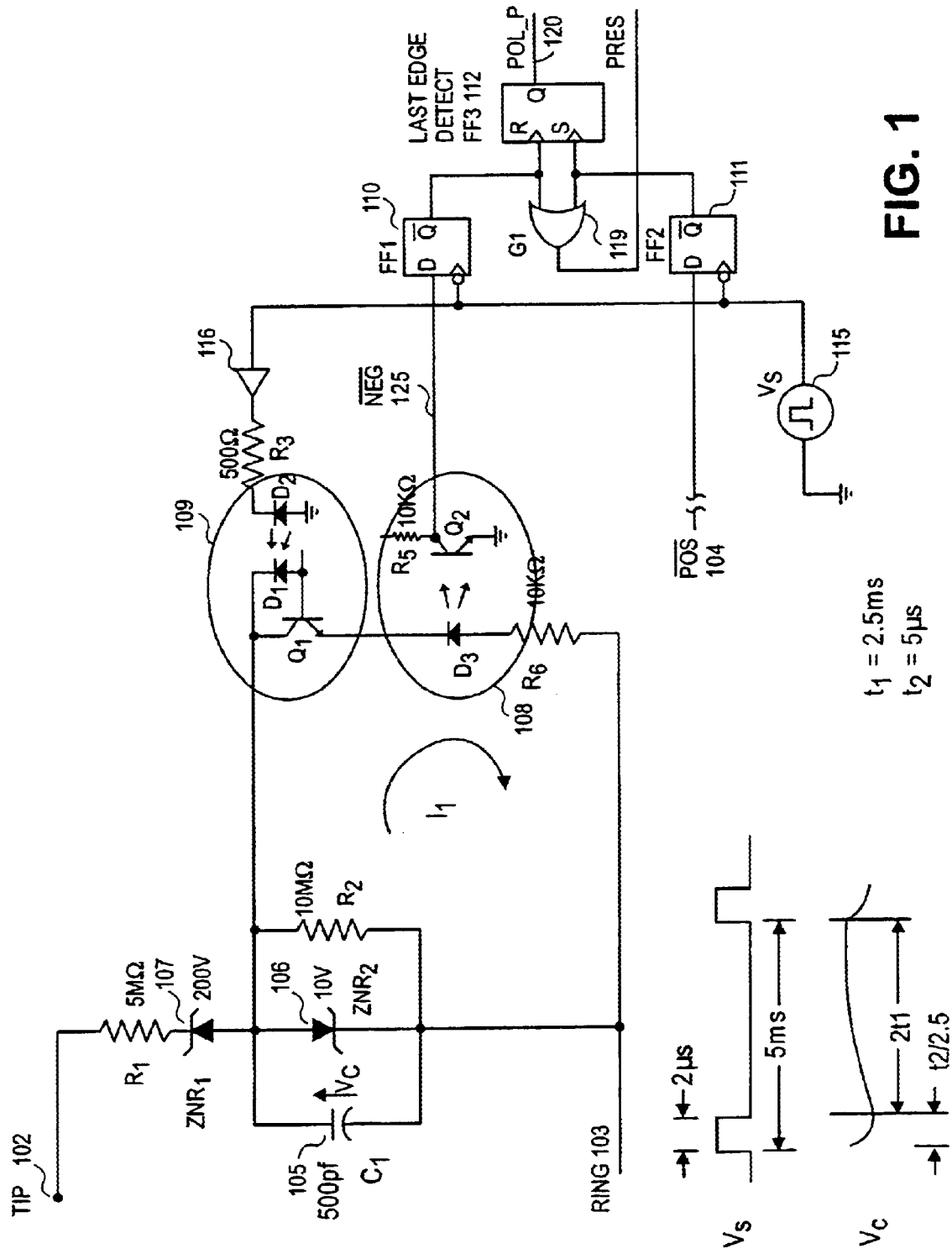
FIG. 1 shows a portion of an exemplary circuit diagram for use in practicing the patented invention.

FIG. 1 shows a portion of an exemplary circuit diagram for use in practicing the patented invention. The arrangement of FIG. 1 includes only the portion of the circuitry that detects positive voltages between the tip 102 and the ring 103. At point 104, the signal NOT POSITIVE detects negative voltages between the tip 102 and ring 103, and is intended to represent a set of circuitry that mirrors the circuitry shown in FIG. 1 for the detection of positive voltages.

The system shown in FIG. 1 includes a charge storage capacitor 105 connected through zenor diodes 106 and 107. Optocouplers 108 and 109 provide optical isolation to prevent sudden surges that could be dangerous from being transferred from the telephone line to the end user equipment.

A set of flip flops 110-112 serves to capture the negative and positive polarity changes in the signal between the tip and ring, thereby assisting in extracting the relevant information from the varying voltage.

We now describe the half of the circuitry shown in FIG. 1, with the understanding that the circuitry is duplicated in mirror form for detecting the negative polarity voltages. In operation, capacitor 105 charges through resistor R1 in response to a positive voltage presented at tip 102. The minimum impedance presented to the tip ring interface is limited by R1. Preferably, the value of R1 and Capacitor 105 are chosen such that the charging time constant is approximately 2.5 milliseconds. In the exemplary embodiment shown in FIG. 1, R1 and C1 are 5 mega ohms and 500 pf, respectively. Given the frequency of the alternating voltage presented to the tip and ring, usually approximately 20 hertz, this value of 2.5 ms is considered optimum.

Voltage source 115 is an alternating voltage which turns the optocoupler 109 on and off in a periodic manner. Amplifier 116 and resistor R3 serve to provide drive strength and current limitation, respectively. The voltage source 115 is not a signal with an equal on and off duty cycle. Rather, the period of voltage source 115 is divided between 2 us on and 3 ms off. When source 115 is on, Q1 is active and capacitor c1 may discharge through 96. The discharge is then measured by Q2, and the collector of Q2 reflects the signal desired to be measured. That output is then latched by flip flop 110.

In a similar manner to that described, the NOT POSITIVE signal 104 is generated by a set of circuitry that is substantially identical to the circuitry shown in FIG. 1. Both negative and positive signals are available from the outputs of the flip flops 110 and 111. As indicated in FIG. 1, the latched signals are then used as inputs to flip flop 112 in order to capture the latest edge, and the polarity signal is output at point 120.

The purpose of the flip flop 112 is to compensate for the fact that the discharge of capacitor C1 takes a finite amount of time which is dictated by the value of R6 and C1. As a result, when voltage is removed from the tip ring interface, the output signal from flip flop 10 may take some time to become false because the capacitor C1 needs to discharge. The amount of time this will take is dependant upon the discharge path of Capacitor 105. However, capacitor 105 may be in the process of discharging through resister R6 when the NOT POSITIVE signal 104 becomes active. Therefore, it is possible that both the NOT POSITIVE signal 104 and the NOT NEGATIVE signal 125 are active at the same time.

Flip flop 112 captures the last change in signals from flip flops 110 and 111, so that the output polarity signal from flip flop 112 accurately reflects the last transition of either of the two outputs from flip flops 110 and 111. Thus, flip flop 112 eliminates the foregoing described potential problem.

Finally, OR gate 119 will output an ON as long as either of the two flip flops 110 and 111 are active. This ensures that the polarity signal is only interpreted and utilized if there is a valid signal present between the tip and ring. In other words, if the tip and ring were entirely disconnected, the output of OR gate 119 would go false, and the system would recognize that the output from flip flop 112 is not a valid output.

As a result of the foregoing, it can be seen that the current path 11 in FIG. 1 consists of a signal which is allowed to flow periodically, for a very short amount of time. If, during that amount of time, there is stored charge on capacitor C1 as a result of the tip ring voltage being positive, then that stored charge will be detected through optocoupler 108 and reflected in the input to flip flop 110. If, on the other hand, the tip ring voltage is negative during a particular cycle, there will be no charge stored on capacitor 105, but instead, the charge will be stored on the companion circuitry (not shown) and the output of that circuitry will be used as the input to flip flop 111. Accordingly, by sampling the stored charge only periodically for a short amount of time, excessive current drain is avoided.

In accordance with the foregoing, it can be seen that the system draws only a very small amount of current, limited by the five mega ohm resistor R1. That small current, which in prior art systems would not be enough to cause accurate operation of optocoupler 108, is rendered sufficient by storing it up over a longer period of time and then dumping it out through the optocoupler 108 in a relatively shorter length of time.

While the foregoing describes the preferred embodiment of the invention, it will be appreciated by those of skill in the art that various modifications and additions may be made. Those additions and modifications are intended to be covered by the following claims.

What is claimed:

1. A circuit to determine the polarity of an on hook voltage between the tip and ring terminals of a telephone, said circuit comprising:

a charge storage device to store charge for a first time period in response to a voltage across the tip and ring terminals of a telephone while said telephone is in the on hook state;

a switch to cause the charge storage device to periodically discharge for a second time period, the second time period being less that the first time period; and a flip-flop to capture a reversal of polarity of said voltage.

2. The circuit of claim 1 wherein said first time period is approximately 2.5 milliseconds and wherein said second time period is approximately 2 microseconds.

3. The circuit of claim 1 wherein the charge storage device is a capacitor and the discharge from said capacitor is used to generate current through an optocoupler.

4. The circuit of claim 1 comprising two of said flip-flops, two of said charge storage devices, and two of said optocouplers, one of each of the foregoing elements configured to detect positive voltage changes, and one of each of the foregoing elements configured to detect negative voltage changes.

5. A method of detecting polarity changes in a voltage across the tip and ring terminals of a telephone network, the method comprising:

repeatedly charging, for a first period, a charge storage device with the voltage across the tip and ring terminals;

periodically discharging the stored charge for a second period;

capturing, with a flip-flop, information conveyed by the discharge to extract data conveyed by the change in polarity of the voltage across the tip and ring terminals.

6. The method of claim 5 wherein said second period is shorter than said first period.

7. The method of claim 6 wherein the first period is approximately 3 milliseconds and the second period is approximately 2 microseconds.

8. An apparatus to detect information conveyed by changes in polarity of a signal, said apparatus comprising:

means for periodically charging a capacitor for a first time period, means for periodically discharging said capacitor for a second time period, means for driving a current through an optical coupler in response to said discharge, and a flip-flop configured to measure an electrical signal produced by said discharge, and to store that state for later use in decoding information.

9. The apparatus of claim 8 wherein said capacitor is approximately 500 picofarads.

10. The apparatus of claim 9 wherein said first and second time periods are 3 milliseconds and 2 microseconds respectively.

11. The apparatus of claim 9 connected to tip and ring terminals of a telephone network.

12. The apparatus of claim 11 further comprising at least one zener diode connected between said tip and ring terminals.

13. The apparatus of claim 9 further comprising an OR logic gate connected to a signal input to said flip-flop to indicate if said signal is valid.

14. The apparatus of claim 13 wherein said optical coupler is connected in series with a resistor.

15. The apparatus of claim 14 wherein the resistor is approximately 10 kilo ohm.

* * * * *

UNITED STATES PATENT AND TRADEMARK OFFICE
CERTIFICATE OF CORRECTION

PATENT NO. : 6,853,723 B1
DATED : February 8, 2005
INVENTOR(S) : Juall

It is certified that error appears in the above-identified patent and that said Letters Patent is hereby corrected as shown below:

Column 3,
Line 1, delete "96" and insert -- R6 --.
Line 16, delete "10" and insert -- 110 --.
Line 38, delete "11" and insert -- I1 --.

Signed and Sealed this

Twenty-fourth Day of May, 2005

JON W. DUDAS
*Director of the United States Patent and Trademark Office*